(12) United States Patent
Aoyama

(10) Patent No.: US 6,981,927 B2
(45) Date of Patent: Jan. 3, 2006

(54) GOLF BALL SURFACE CONFIGURATION FOR IMPROVED BUFFING

(75) Inventor: Steven Aoyama, Marion, MA (US)

(73) Assignee: Acushnet Company, Fairhaven, MA (US)

( * ) Notice: Subject to any disclaimer, the term of this patent is extended or adjusted under 35 U.S.C. 154(b) by 203 days.

(21) Appl. No.: 10/455,391

(22) Filed: Jun. 6, 2003

(65) Prior Publication Data

US 2004/0248668 A1 Dec. 9, 2004

(51) Int. Cl.
*A63B 37/14* (2006.01)

(52) U.S. Cl. ........................................ 473/378; 264/275
(58) Field of Classification Search ............... 473/378; 264/275, 279.1; 425/121, 116
See application file for complete search history.

(56) References Cited

U.S. PATENT DOCUMENTS

| 6,129,611 A | 10/2000 | Yamaguchi ................... 451/50 |
| 6,726,869 B2 * | 4/2004 | Aoyama et al. ............. 264/275 |
| 2002/0158364 A1 | 10/2002 | Aoyama et al. ............. 264/220 |

* cited by examiner

*Primary Examiner*—Raeann Gorden
(74) *Attorney, Agent, or Firm*—Swidler Berlin Shereff Friedman, LLP

(57) ABSTRACT

An improved mold and method of making a golf ball product is disclosed. The mold parts are flared outward towards the parting line, which creates a golf ball product having a flared area around the equator. The flared area is provided to facilitate post-mold processing steps, particularly buffing. Dimples are formed on the outer surface of the golf ball product, including the flared area. The flared area is removed, resulting in a spherical outer surface having uniform dimples throughout, including the equatorial region. Thus, the flared area allows for more an improved post-buff golf ball product.

4 Claims, 13 Drawing Sheets

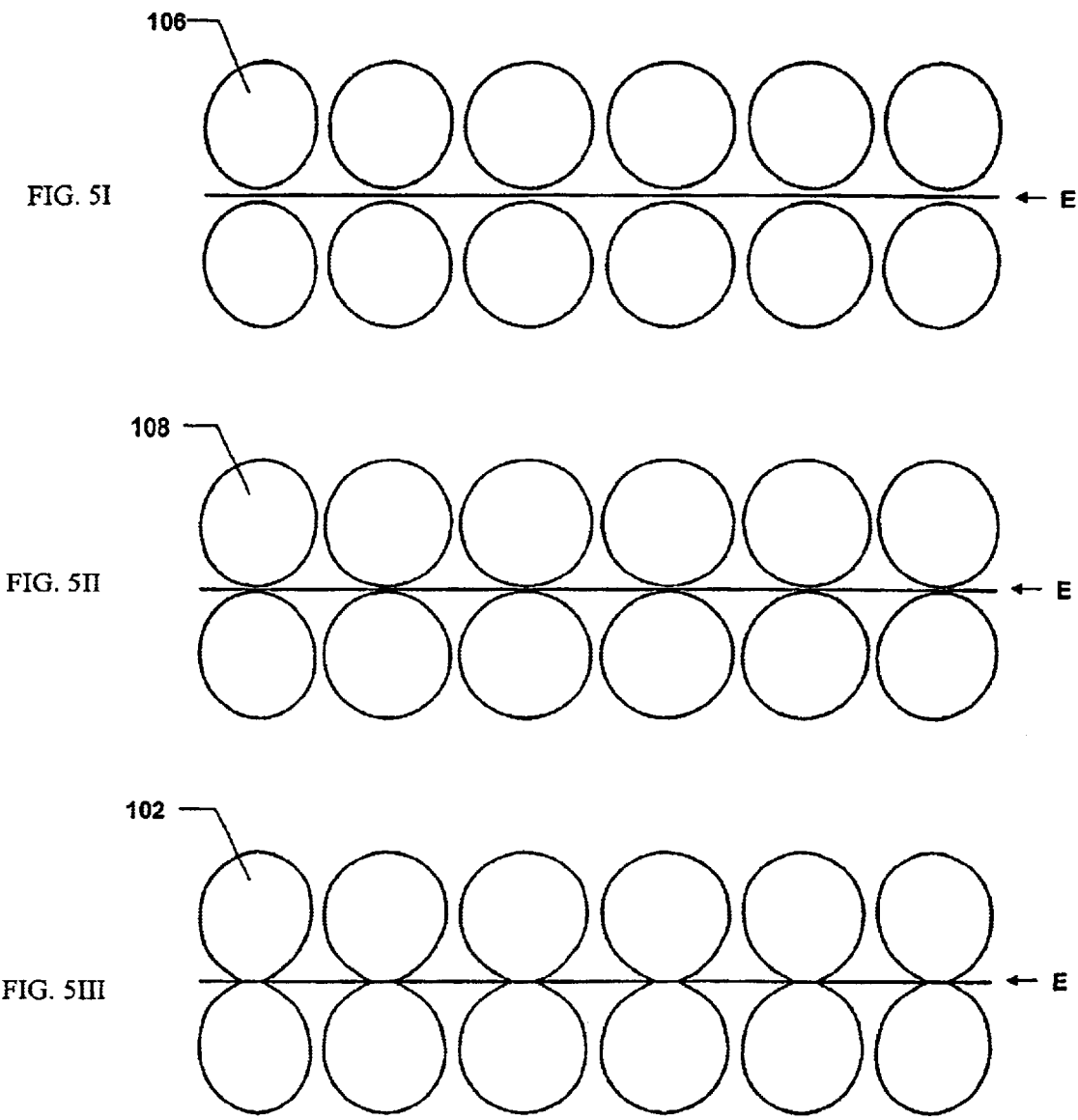

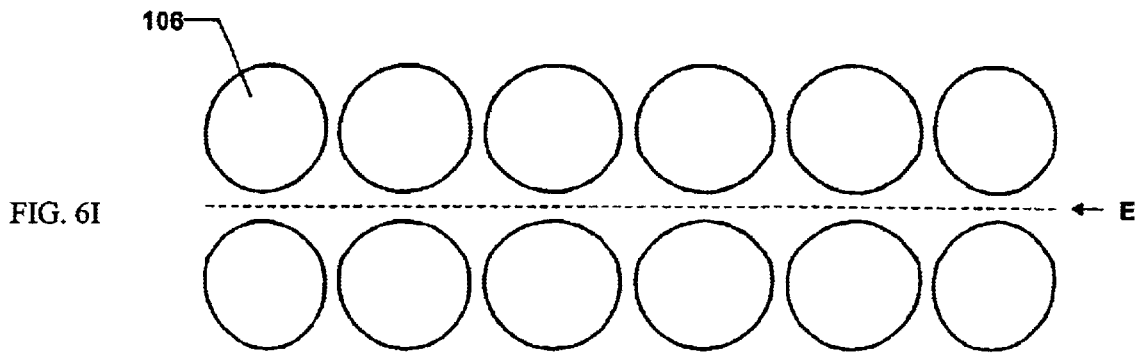
FIG. 6I
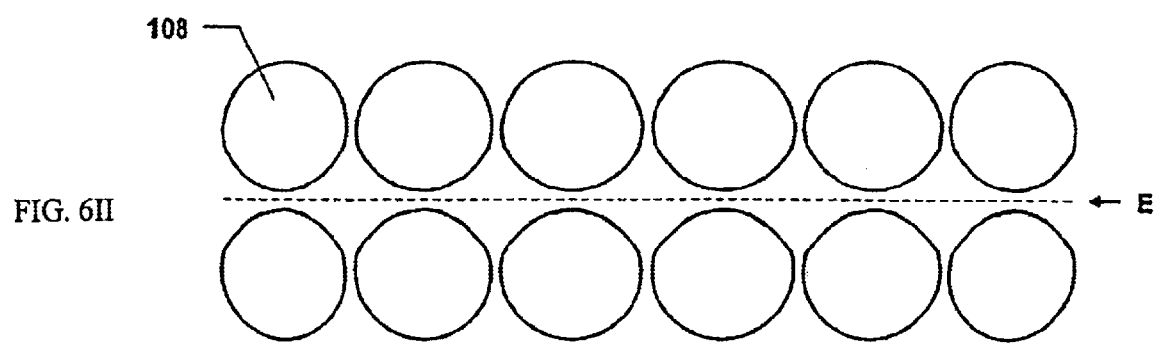
FIG. 6II
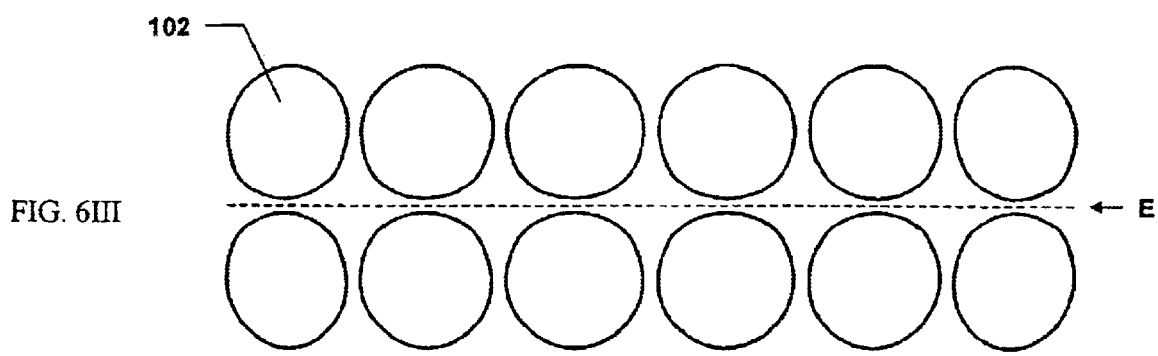
FIG. 6III

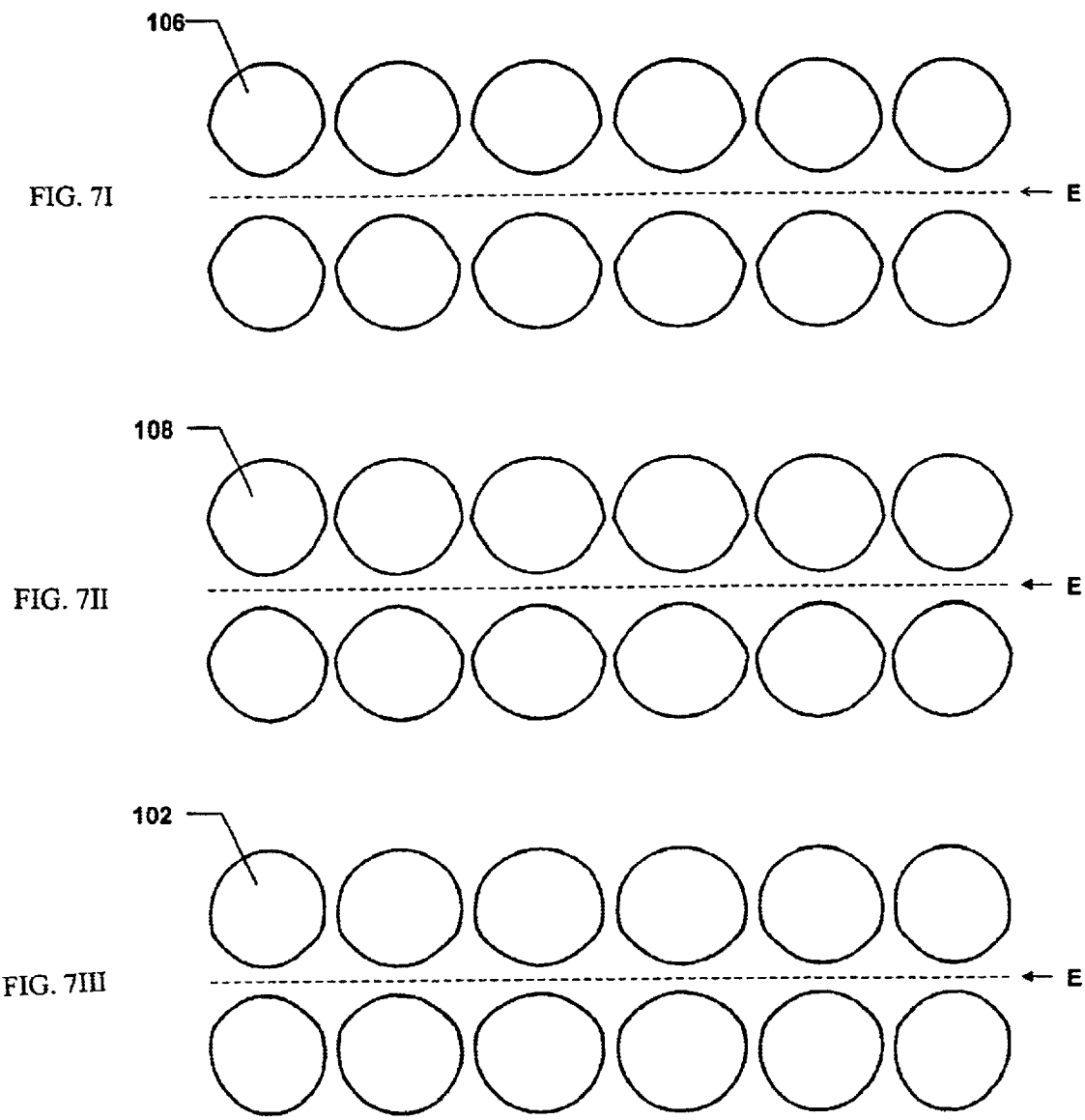

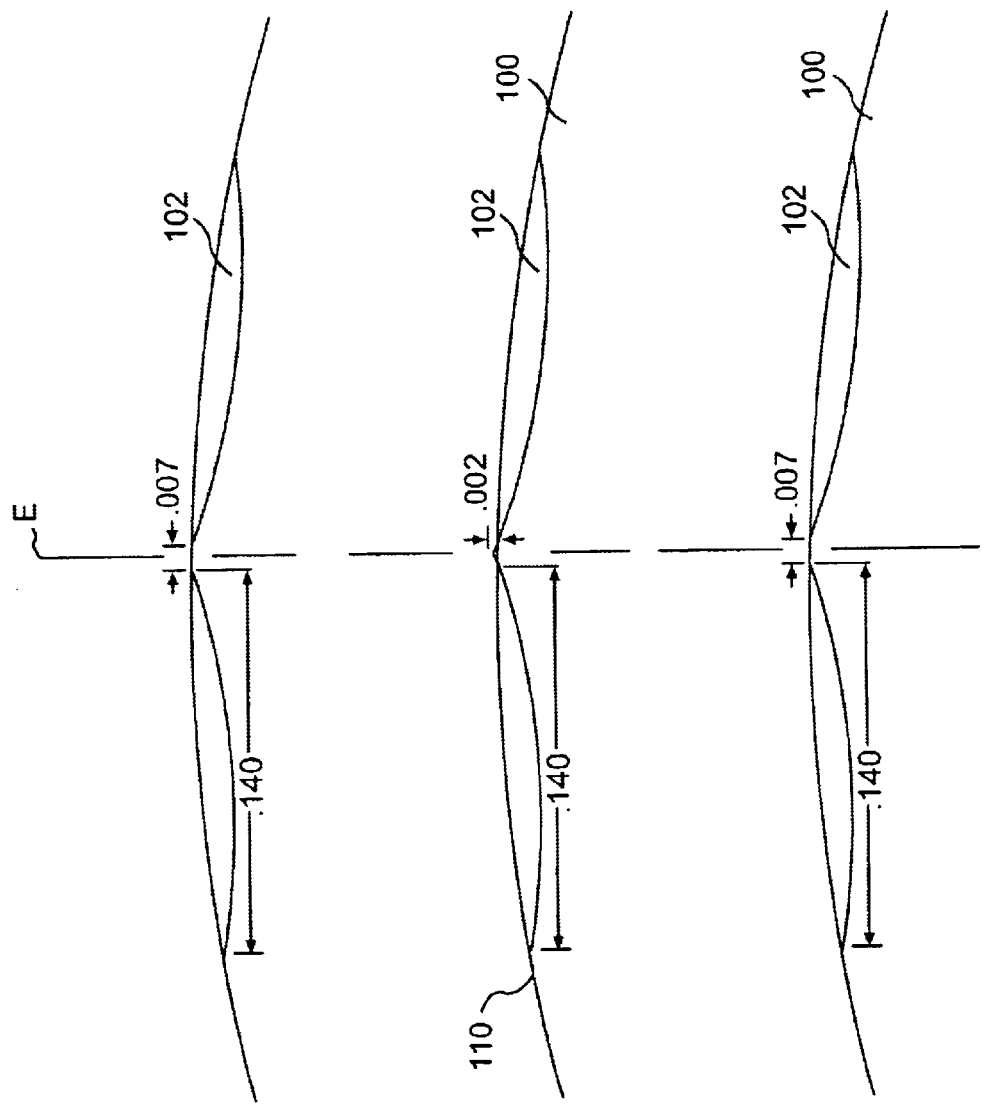

FIG. 9I
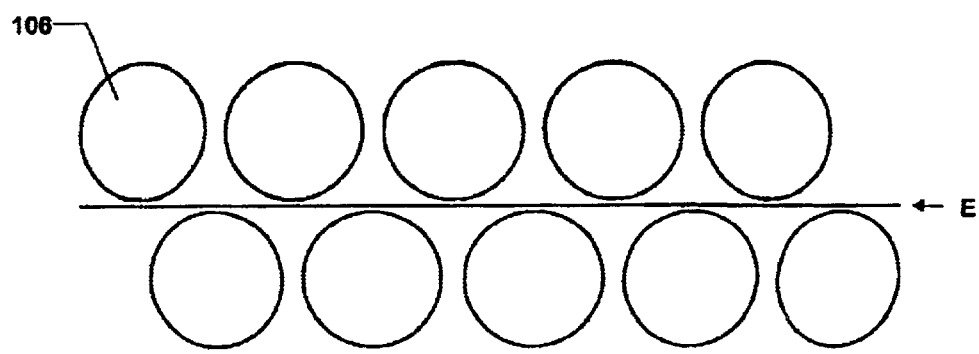
FIG. 9II
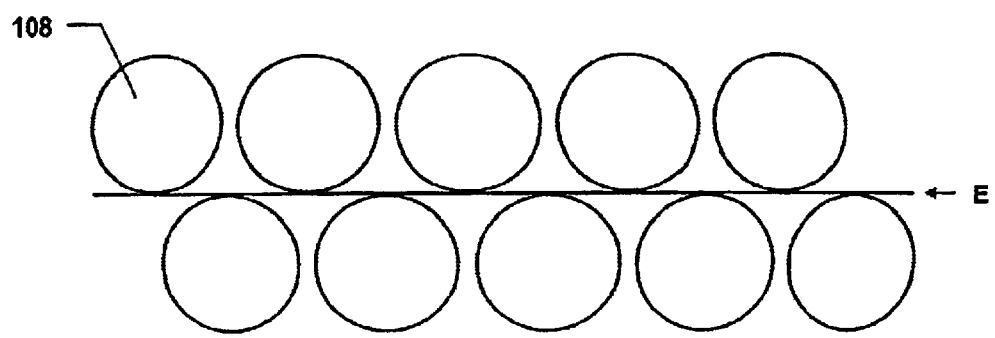
FIG. 9III
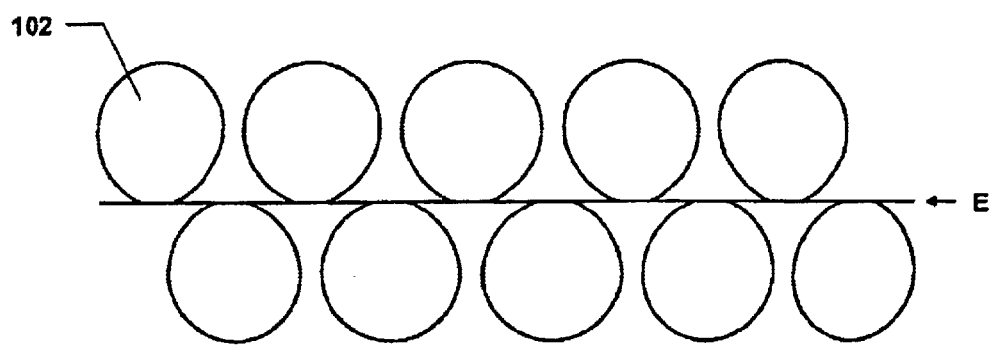

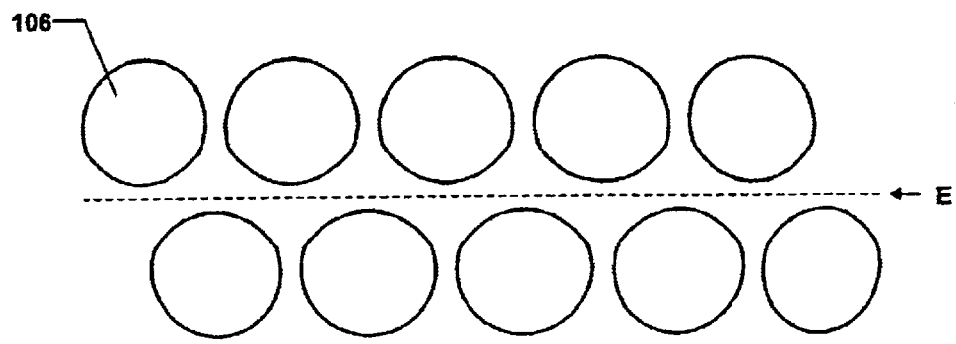
FIG. 10I
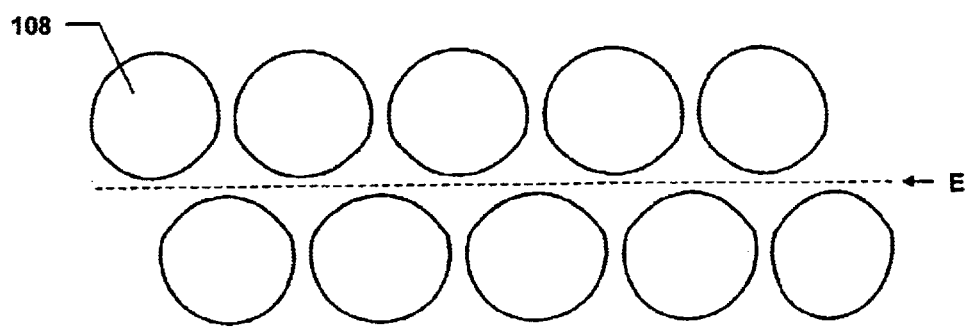
FIG. 10II
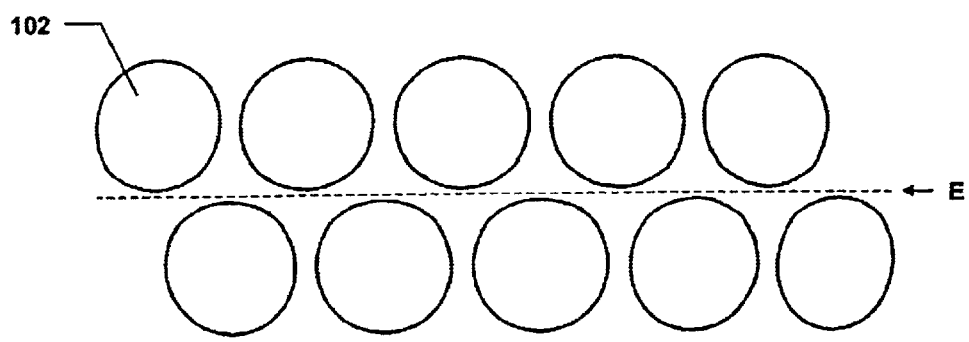
FIG. 10III

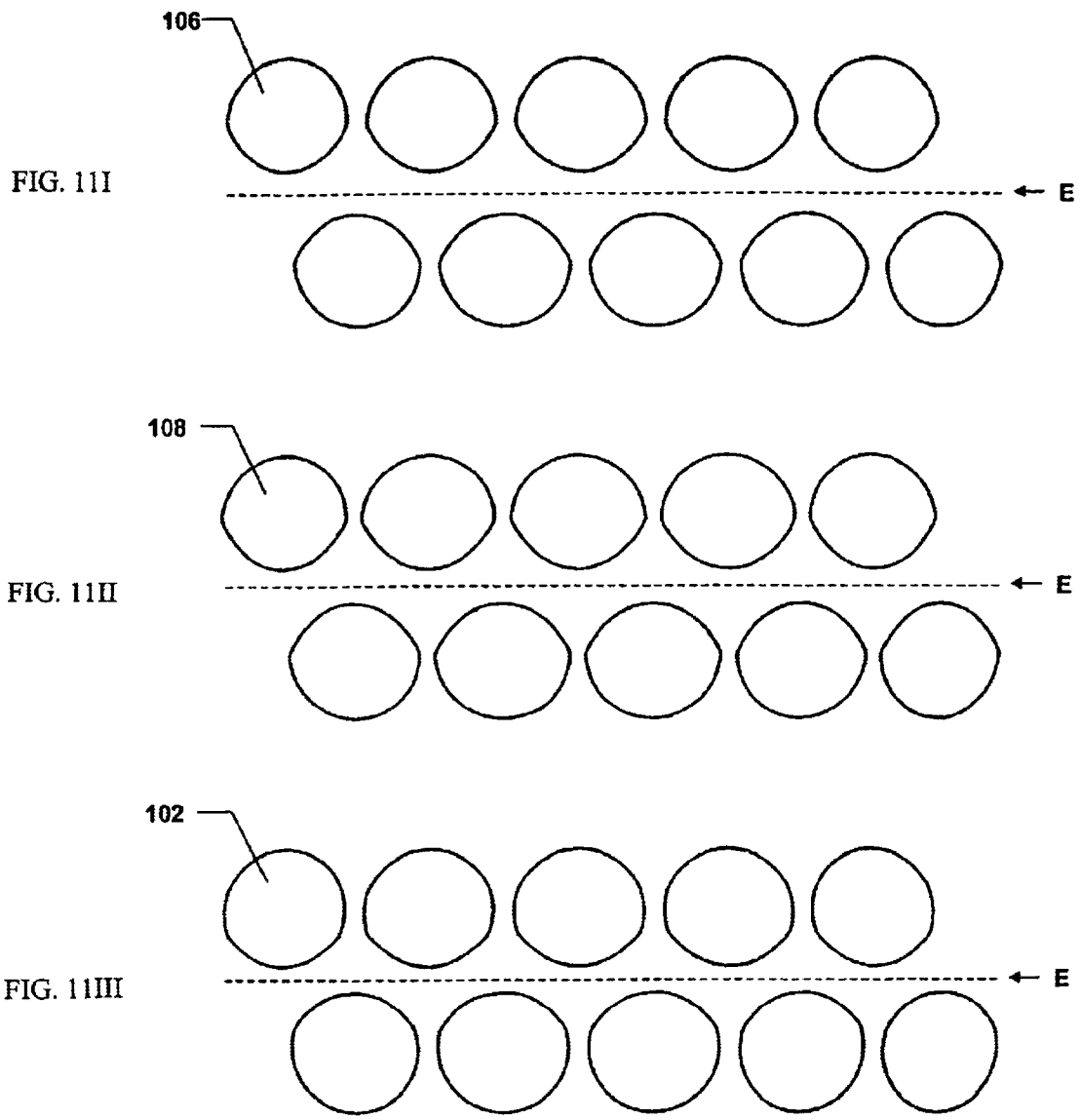

GOLF BALL SURFACE CONFIGURATION FOR IMPROVED BUFFING

BACKGROUND OF THE INVENTION

1. Field of the Invention

The present invention relates to manufacturing. In particular, the present invention relates to a method of making a product having a surface configuration for improved buffing and the product itself. More particularly, the present invention relates to a method of making a golf ball product having a surface configuration for improved buffing and the golf ball product itself.

2. Description of the Related Art

Conventionally, golf balls are made by molding a cover around a core. The core may be wound or solid. A wound core typically comprises elastic thread wound about a solid or liquid center. Solid cores typically comprise a single-piece, solid center or a solid center covered by one or more mantle or boundary layers of material. Wound cores may also include one or more mantle layers.

The cover may be injection molded, compression molded, or cast molded over the core. Injection molding typically requires a mold having at least one pair of mold cavities that mate to form a spherical recess. In addition, a mold may include more than one mold cavity pair. A core is held within the center of the mold and liquid cover material is introduced into the mold around the core. With reaction injection molding (RAM), two or more reactive components are used to form the layer material. The components are mixed just prior to or simultaneously with injection into the mold.

Compression molds also typically include multiple pairs of mold cavities, each pair comprising first and second mold cavities that mate to form a spherical recess. In one exemplary compression molding process, a cover material is preformed into half-shells, which are assembled around each core. The assemblies are placed in the mold cavities, and the mold is closed. The core and cover combination is then exposed to heat and pressure, which cause the cover half-shells to combine and form a full cover.

Casting processes also typically utilize pairs of mold cavities. In a casting process, a cover material is introduced into a first mold cavity of each pair. A core is then either placed directly into the cover material or is held in position (e.g., by an overhanging vacuum or suction apparatus) to contact the cover material in what will be the spherical center of the mold cavity pair. Once the cover material is at least partially cured (e.g., to a point where the core will not substantially move), the cover material is introduced into a second mold cavity of each pair, and the mold is closed. The closed mold is then subjected to heat and pressure to cure the cover material thereby forming a cover on the core.

These processes may also be used to form an intermediate layer over the core.

As a common feature of injection molding, compression molding, and cast molding, when used to form a golf ball cover, the mold cavities typically include a pattern of protrusions to impart a dimple pattern on the cover during the molding process. Conventional dimples are depressions that act to reduce aerodynamic drag and increase aerodynamic lift. These dimples are formed where a dimple wall slopes away from the outer surface of the ball, forming a depression.

Although the preferred dimple is circular when viewed from above, the dimples may be oval, triangular, square, pentagonal, hexagonal, heptagonal, octagonal, etc. Possible cross-sectional shapes include, but are not limited to, circular arc, truncated cone, flattened trapezoid, and profiles defined by a parabolic curve, ellipse, semi-spherical curve, saucer-shaped curve, sine curve, or the shape generated by revolving a catenary curve about its symmetrical axis. Other possible dimple designs include dimples within dimples and constant depth dimples. In addition, more than one shape or type of dimple may be used on a single ball, if desired. See U.S. Pat. No. 5,556,943 and U.S. patent application Ser. Nos. 10/077,090 and 09/989,191, which are incorporated herein by reference in their entireties.

The dimples on a golf ball are important in reducing drag and increasing lift. Drag is the air resistance that acts on the golf ball in the direction opposite the ball's flight direction. As the ball travels through the air, the air that surrounds the ball has different velocities and, thus, different pressures. The air exerts maximum pressure at a stagnation point on the front of the ball. The air then flows around the surface of the ball with an increased velocity and reduced pressure. At some separation point, the air separates from the surface of the ball and generates a large turbulent flow area behind the ball. This flow area, which is called the wake, has low pressure. The difference between the high pressure in front of the ball and the low pressure behind the ball acts to slow the ball down. This is the primary source of drag for golf balls. The dimples on the golf ball cause a thin boundary layer of air adjacent the outer surface of the ball to flow in a turbulent manner. The turbulence energizes the boundary layer and helps move the separation point further backward, so that the layer stays attached further along the outer surface of the ball. As a result, there is a reduction in the area of the wake, an increase in the pressure behind the ball, and a substantial reduction in drag.

Once the dimpled cover is formed, the covered core is removed from the mold (demolded). Once demolded, golf balls usually require finishing process steps, such as buffing, surface preparation, painting, logo application, etc. Since molding requires the use of two or more mold parts, extra material frequently collects at the union of the mold parts during the molding process. This "flash" is removed by buffing the area of the cover that was adjacent the mold parting line. Known buffing processes generally involve the use of sanding belts, grinding wheels, or rotary cutting tools to remove the flash material. Typically, it also removes some dimpled cover material in the immediate vicinity of the seam. This makes the adjacent dimples shallower than intended. This also distorts the dimple shape, giving them a pointed, football-like outline. Additionally, this enlarges the dimple spacing across the parting line, since part of the dimple adjacent the seam line is removed. This adversely effects the aerodynamics of the golf ball by creating shallower dimples and an enlarged no-dimple band around the ball equator. This also creates an unbalanced look to the ball. If the distortion is severe enough, it can cause the ball to fail the USGA symmetry test, which states that a golf ball must not be designed or manufactured to have properties which differ from those of a spherically symmetrical ball.

Known attempts to compensate for these effects include deepening and/or enlarging the dimples adjacent the seam line and/or positioning the dimples closer to the seam line. However, buffing of these balls still results in distorted dimples along the parting line.

What is needed is a golf ball design, mold, and manufacturing method yielding a better post-buff golf ball.

SUMMARY OF THE INVENTION

The present invention relates to a method of forming a golf ball product. The method includes providing mating mold parts. The mold parts cooperate to form a mold by aligning parting surfaces of the mold parts. The mold has interior surfaces of a generally spherical shape with an enlarged flared area toward the parting surfaces. A primary golf ball product is placed within the mold, and a layer is molded thereon to form a golf ball product. The golf ball product has a generally spherical shape with a flared volume along a parting line of the golf ball product. The golf ball product is removed from the mold, and the flared volume is removed from the golf ball product.

The layer that is formed may be a golf ball, in which case cover the mold surface has dimple-forming protrusions thereon. Thus, the molding step includes forming dimples in the cover. The dimples in the flared volume are relatively deeper than the dimples outside the flared volume. Dimples of varying relative depths may be formed within the flared area.

The present invention also relates to a mold. The mold includes a first mold part having a first recessed area with a first edge, and a second mold part having a second recessed area with a second edge. The first recessed area and the second recessed area cooperate to form a molding surface by aligning the first edge and the second edge to form a parting line. The molding surface is shaped so as to produce a substantially spherical object with an enlarged flared volume around the parting line.

The first mold part may have a first pole, and the second mold part may have a second pole. The molding surface may be shaped to produce an object having a parting line diameter that is greater than a pole-to-pole diameter. The molding surface may be shaped to produce an object with the parting line diameter being approximately 0.001% to approximately 0.006% greater than the pole-to-pole diameter. Alternatively, the molding surface may be shaped to produce an object with the parting line diameter being approximately 0.002% greater than the pole-to-pole diameter. The molding surface may be shaped to produce an object with the parting line diameter being approximately 0.001 inch to approximately 0.012 inch greater than the pole-to-pole diameter. Alternatively, the molding surface may be shaped to produce an object with the parting line diameter being approximately 0.002 inch to approximately 0.006 inch greater than the pole-to-pole diameter.

Each recessed area may contain a flared region bordering the edge, and each of the flared regions may commence at a latitude angle of approximately 70° to approximately 80° from a pole of the corresponding recessed area and extend to the parting line. Alternatively, each of the flared regions may commence at a latitude angle of approximately 85°.

The present invention relates to a golf ball product. The golf ball product has a core and an outer layer formed over the core. The outer layer is substantially spherical toward poles of the golf ball product and flared outward toward the equator of the golf ball product. The outer layer is substantially spherical except for an equatorial region of the golf ball product. The equatorial region may have a substantially frustoconical shape when viewing a cross section of the ball from the parting line to a pole of the ball. The golf ball product may include one or more intermediate layers between the core and the outer layer.

DESCRIPTION OF THE DRAWINGS

The present invention is described with reference to the accompanying drawings, in which like reference characters reference like elements, and wherein:

FIG. 5I shows a pre-buff view of a golf ball product of the present invention, and FIGS. 5II and 5III show comparative views of two known golf ball products;

FIG. 6I shows a post-buff view of a golf ball product of the present invention, and FIGS. 6II and 6III show comparative views of two known golf ball products;

FIG. 7I shows a heavy-buffed view of a golf ball product of the present invention, and FIGS. 7II and 7III show comparative views of two known golf ball products;

FIG. 8I shows a view of an ideal golf ball product and a preferred embodiment of a golf ball product made according to the present invention, FIG. 8II shows the golf ball product of FIG. 8I upon demolding, and FIG. 8III shows the golf ball product of FIG. 8I after buffing;

FIG. 9I shows a pre-buff view of a golf ball product of the present invention, and FIGS. 9II and 9III show comparative views of two known golf ball products;

FIG. 10I shows a post-buff view of a golf ball product of the present invention, and FIGS. 10II and 10III show comparative views of two known golf ball products; and FIG. 11I shows a heavy-buffed view of a golf ball product of the present invention, and FIGS. 11II and 11III show comparative views of two known golf ball products.

DETAILED DESCRIPTION OF THE INVENTION

Figure 1:
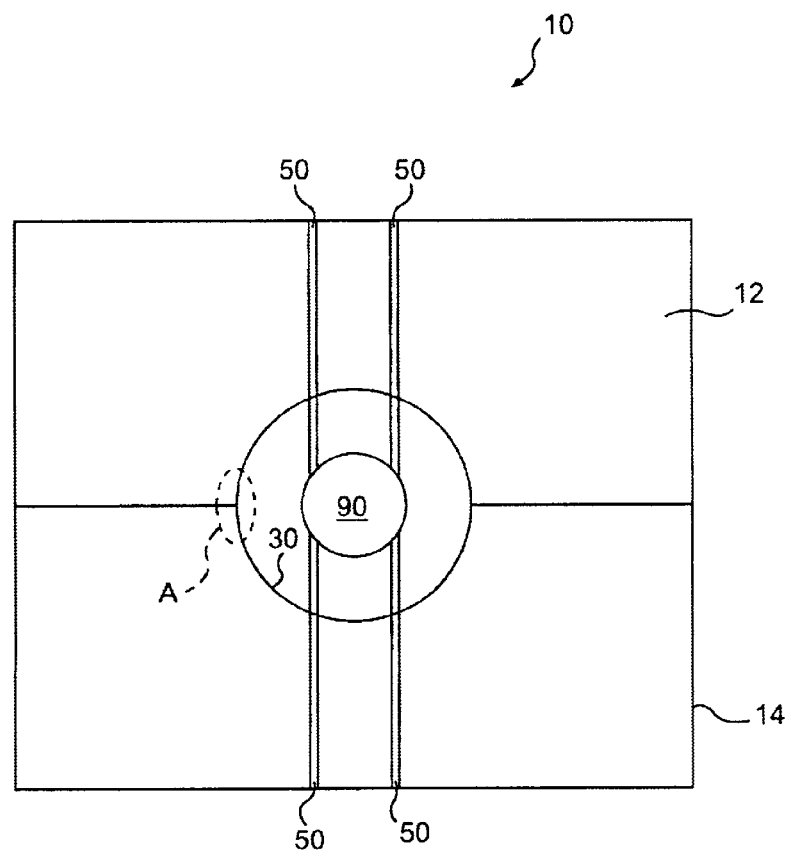
FIG. 1 shows a mold according to the present invention in a closed position.
Figure 2:
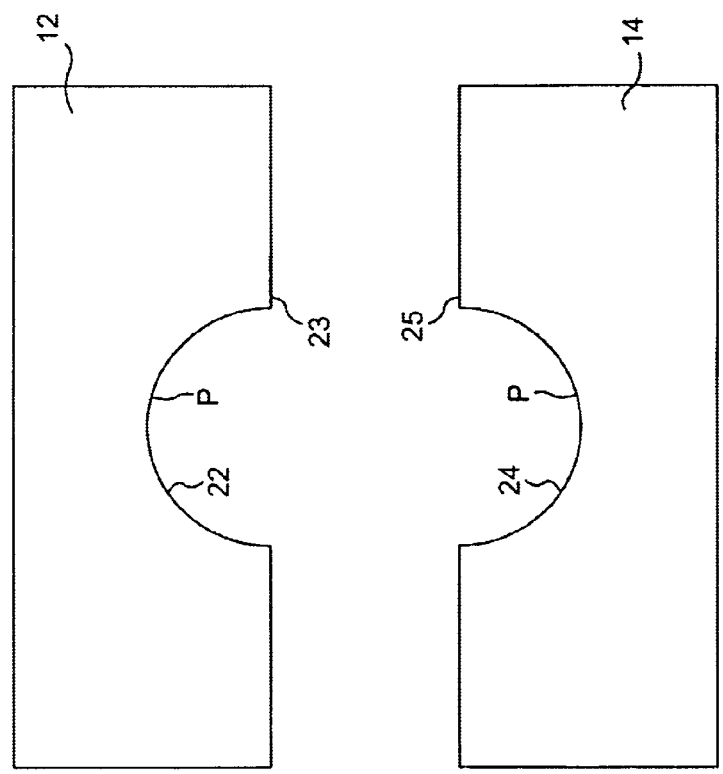
FIG. 2 shows the mold of FIG. 1 in an open position.

FIG. 1 shows a mold 10 according to the present invention in a closed position, and FIG. 2 shows mold 10 in an open position. While mold 10 is shown for illustrative purposes in the figures as being a retractable pin injection mold, the present invention is applicable to any type of mold, including, for example, compression molds, reaction injection molds, and casting molds. Mold 10 includes mating mold parts 12, 14. Each mold part 12, 14 contains a recessed area 22, 24. Each recessed area 22, 24 has a pole P and an edge 23, 25. By aligning edges 23, 25, mold parts 12, 14 cooperate to form a molding surface 30. The union of edges 23, 25 is referred to as the parting line PL.

Figure 1A:
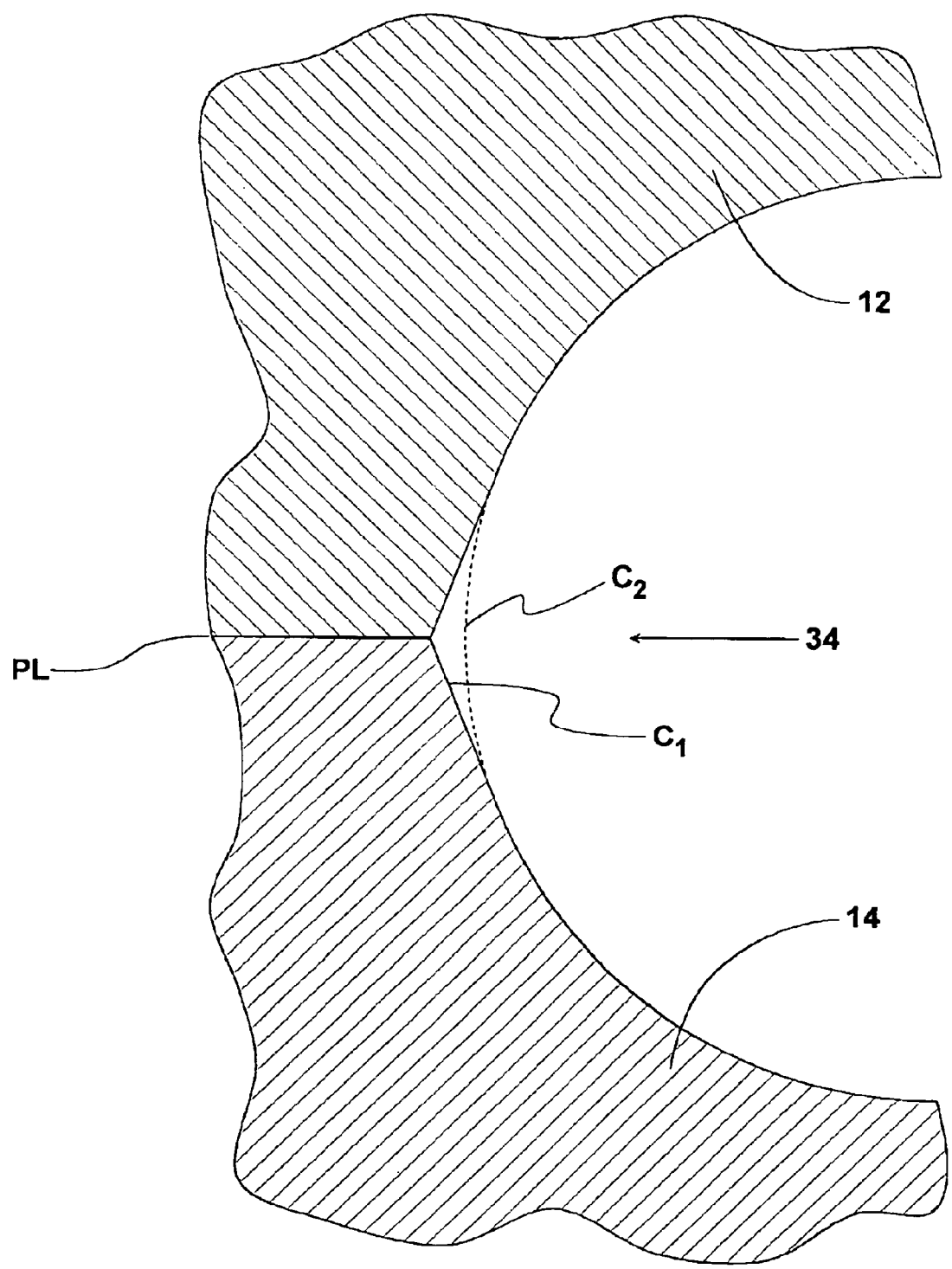
FIG. 1A shows a close-up of the mold of FIG. 1.

Each of areas 22, 24 are substantially hemispherical. However, each area 22, 24 has a region that is flared outward toward edges 23, 25. Thus, areas 22, 24 cooperate to form a substantially spherical surface 30 having a flared area 34 around parting line PL. FIG. 1A shows a close-up of mold 10 around area A. Flared area 34 has a generally frustoconical shape when viewing a cross section of the ball from the parting line to a pole of the ball. A phantom curve $C_2$ shows a spherical curve. The curve $C_1$ of surface 30 around parting line PL is flared outward from curve $C_2$. Each of the flared regions occupies an area beginning at a particular latitude angle measured from a pole P (0°) and ending at parting line PL (90°). The latitude angle to the beginning of a flared region can be approximately 70° to approximately 88°, and more preferably begins at approximately 86°. It is understood that parting line PL does not necessarily lie in a plane, nor is it necessarily parallel to equator E. See U.S. Pat. Nos. 4,389,365 and 5,874,038, and U.S. patent application Ser. No. 10/078,417, which are incorporated herein by reference in their entireties.

Figure 3:
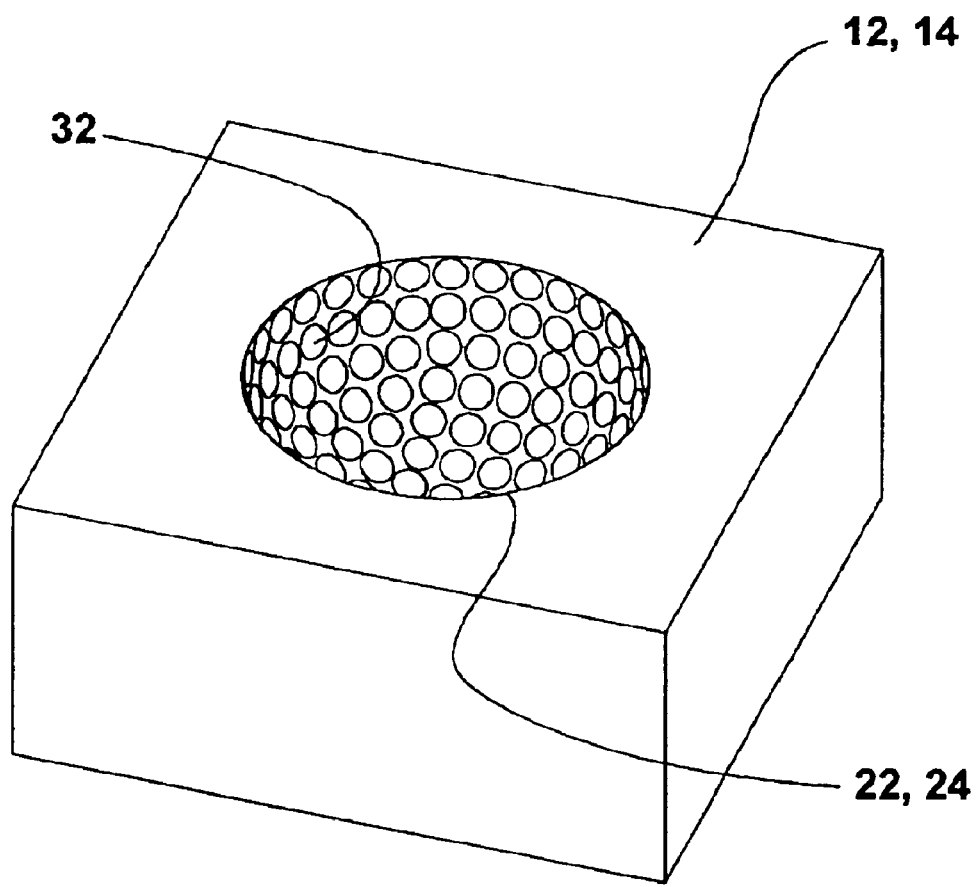
FIG. 3 shows a view of the cavity of the mold of FIG. 1.
Figure 4:
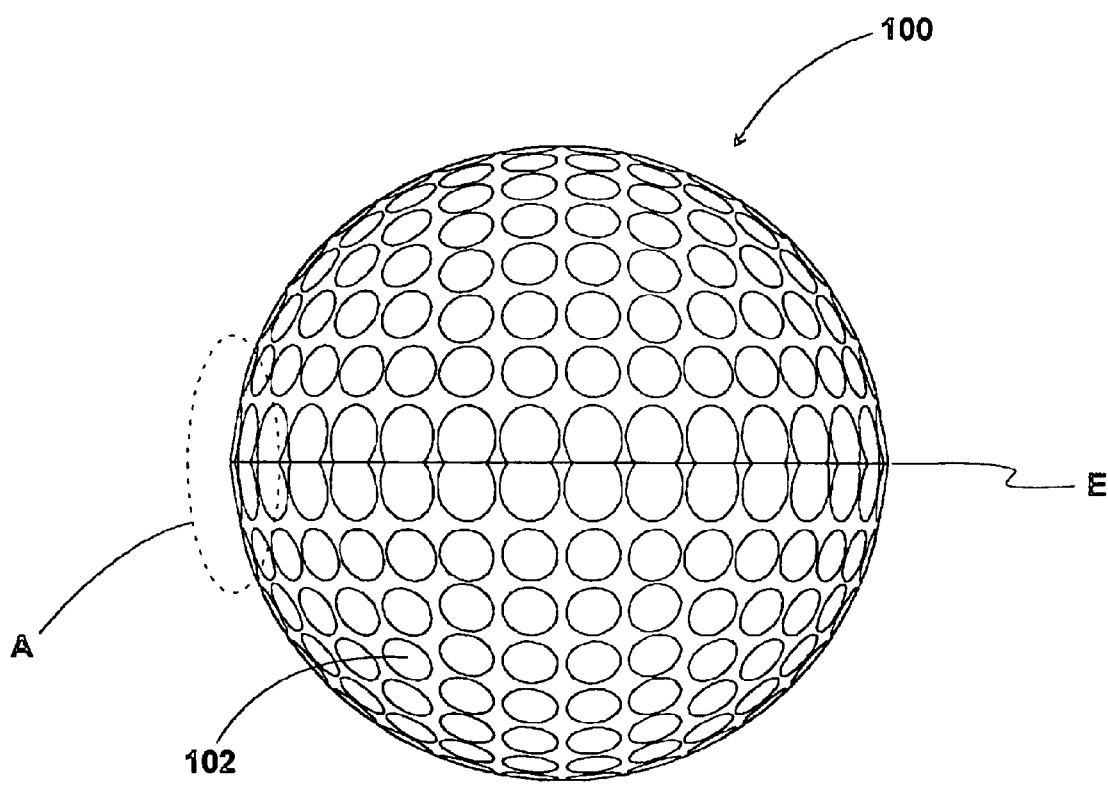
FIG. 4 shows a golf ball product made using the mold of FIG. 1.

FIG. 3 shows a view of mold parts 12, 14 looking into recessed areas 22, 24 of mold 10. Each surface 22, 24 has a number of protrusions 32 thereon. FIG. 4 shows a golf ball product 100 made using the mold of FIG. 1. For the purposes of this patent, "golf ball product" is intended to mean a golf ball at any stage of development. This could be, for example, a core, a core with one or more mantle layers formed thereon, a core and a cover, a core with one or more mantle layers and a cover, etc. While it is envisioned that the present invention will primarily be used to form the cover or outermost layer of a golf ball, it may also be used to form internal layers, though it is likely protrusions 32 will be omitted in that case. Protrusions 32 are arranged to form a predetermined dimple pattern on a golf ball product made using mold 10. In order for the end-product golf ball to have dimples 102 of the intended depth or depths, which is desired to facilitate the ball having uniform aerodynamic performance regardless of ball orientation, protrusions 32 within flared area 34 are relatively deeper or longer than corresponding protrusions 32 outside flared area 34. That is, the relative depths of dimples 102 formed by protrusions 32 in area 34 are greater than that of corresponding dimples 102 outside area 34. However, the bottommost points of corresponding dimples 102 are approximately equidistant from the center of golf ball product 100, regardless of whether they are inside or outside flared area 34. As the amount of flare increases within area 34 in the direction from poles P towards parting line PL, the difference in the lengths of protrusions 32 increases. The positions of protrusions 32 on surface 30 can be determined according to known methods. For example, U.S. patent application Ser. Nos. 09/989,191, 10/122,189, and 10/361,574 and U.S. Pat. No. 6,338,684, all of which are incorporated herein in their entireties, disclose dimple patterns. Since the equator E of golf ball product 100 usually correlates to parting line PL, protrusions 32 within area 34 usually form dimples 102 surrounding equator E, which are relatively deeper than the other dimples 102.

In use, golf ball product 100 is made using mold 10 in known fashion. For exemplary purposes only, if mold 10 is a retractable pin mold, a core or other primary golf ball product 90 is placed within mold 10 and held there by retractable pins 50. For purposes of this patent, "primary golf ball product" means the golf ball product upon which a layer is to be formed. For simplicity, the following discussion will refer to a layer being formed on a core 90, although the layer could be formed in the same manner on other primary golf ball products, such as a mantle layer surrounding a core. Layer-forming material is introduced into the mold cavity between surface 30 and core 90. After sufficient material to support core 90 in the center of the mold cavity has been introduced, pins 50 are retracted so a complete layer can be formed on core 90. Mold 10 is kept closed to allow the layer-forming material to solidify, during which time mold 10 and the contents within mold 10 (core 90 and the layer-forming material) may be subjected to heat treatment. After a predetermined amount of time, mold 10 is opened and golf ball product 100 is demolded. Golf ball product 100 is then ready for more manufacturing steps or post-mold treatments, such as buffing, painting, and labeling. If mold 10 is a mold other than a retractable pin mold, golf ball product 100 is formed in known fashion according to the type of mold used.

Figure 4A:
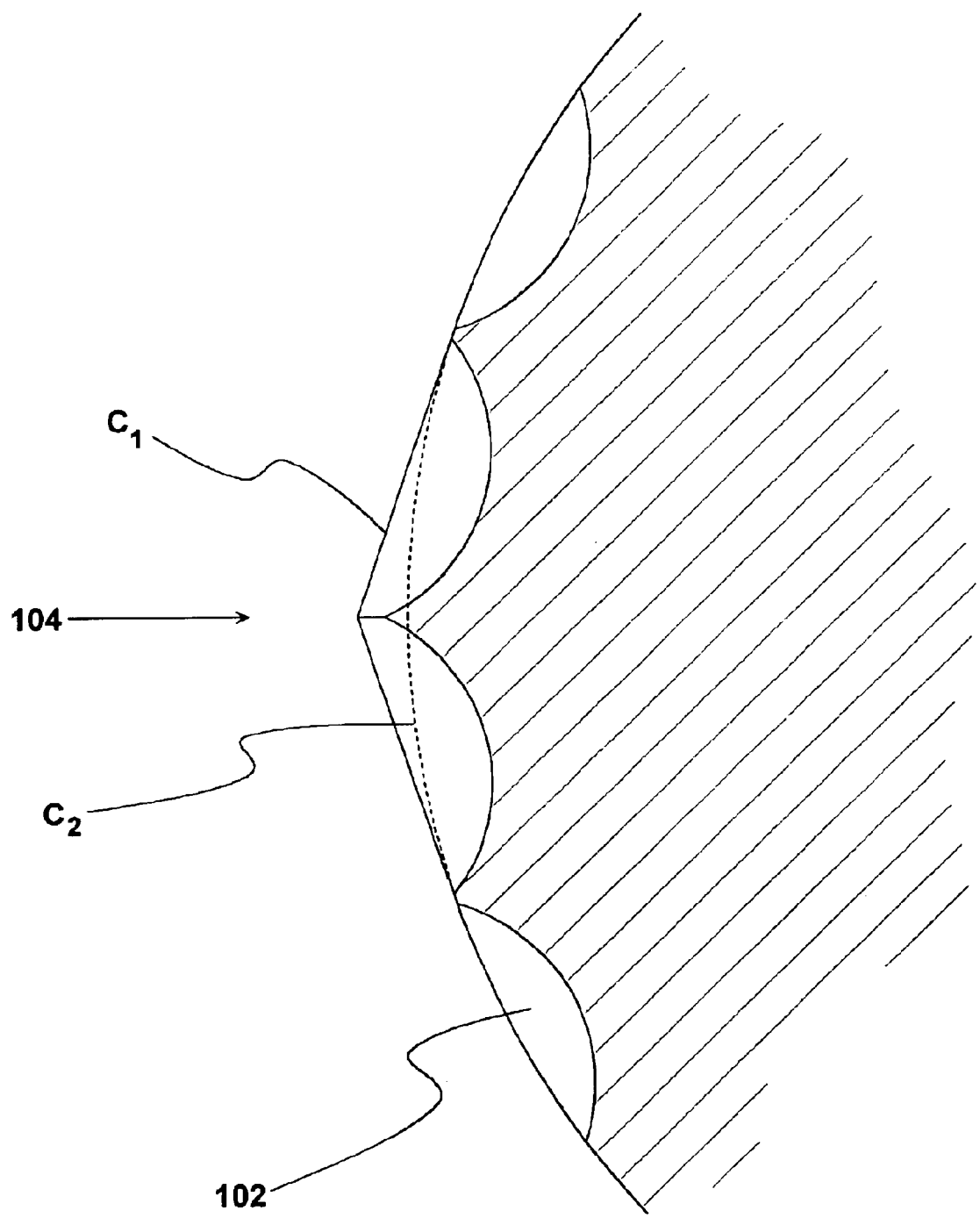
FIG. 4A shows a close-up of a cross section of the golf ball product of FIG. 4.

As mentioned above, one common post-mold finishing step is buffing. Flared area 34 causes golf ball product 100 to have an enlarged diameter in the area 104 surrounding equator E. This is shown in more detail in FIG. 4A, which shows a close-up of a cross section of a of golf ball product 100 around area A of FIG. 4. There it is seen more clearly that dimples 102 get progressively deeper as they approach equator E. This enlarged area 104 surrounding equator E extends outward to curve $C_1$. For comparison, curve $C_2$ shows a spherical curve.

After demolding, area 104 is removed from golf ball product 100. This is typically done by buffing, which may include cylindrical cutting, spherical cutting, sanding, or the like. Because dimples 102 within area 104 were made relatively deeper than the corresponding other dimples 102, removal of flared area 104 results in a substantially spherical golf ball product 100 having uniform dimples 102 over the entire surface. By providing extra material via area 104, unwanted removal of cover material, including at dimples 102, is avoided. The result is a buffed ball having uniform corresponding dimples 102 over its entire surface including the buffed area. The extra material at area 104 also permits a more aggressive buffing cut to be made without fear of damaging dimples 102. Thus, by providing a golf ball product that is intentionally non-uniform after demolding, a golf ball product having improved post-buff characteristics is achieved.

FIGS. 5–7 show comparisons of a golf ball product made according to the present invention and two conventional golf ball products at various stages of post-mold processing. FIG. 5 shows a pre-buff comparison of two known golf ball products I, II and a golf ball product III of the present invention. Each of groups I, II, III shows two rows of dimples—one above and one below the equator.

Group I shows the conventional situation, with no compensation made for the buffing effect. The dimples 106 around the equator are unaltered.

Group II shows a known attempt to compensate for the buffing effect by providing enlarged and deepened dimples 108. Dimples 108 of this group have also been shifted in position until they nearly touch across the equator. Notice that the spacing between adjacent dimples 108 parallel to the equator is much tighter than the spacing between adjacent dimples 106 of the unaltered ball.

Group III shows a buffing line configuration according to the flared equator design of the present invention. In this embodiment, the flared region begins approximately 86° from the pole. Prior to buffing, these dimples 102 appear to be egg-shaped and overlap with dimples 102 across the equator.

FIG. 6 shows a post-buff comparison of groups I, II, III of FIG. 5. The buff performed was a 0.002 inch deep cylindrical buff, which is typical in the art. This is the type of buff that is achieved using a flat sanding belt, cylindrical grinding wheel, or cylindrical cutting tool. Conventional dimples 106 of Group I are noticeably altered, and the spacing between dimples 106 across the equator is too great. When the equator is buffed, material is removed at and between the rows of dimples closest to the equator. This distorts the dimples, making them effectively shallower and smaller in diameter. It also flattens the sides of the dimples nearest the equator, giving them a D-shape. The heavier the buffing, the more pronounced the effect. If this distortion is severe enough, it can cause a ball to fail the USGA symmetry test.

Enlarged/shifted dimples 108 of Group II are also D-shaped, but the spacing across the equator is not as bad as in Group I. The spacing between adjacent dimples 108 parallel to the equator, however, is too small.

Dimples 102 of Group III, made according to the flared equator scheme of the present invention, are almost perfectly round. The spacing between dimples 102 both across and parallel to the equator is proper. In addition to providing improved and more uniform aerodynamic performance, dimples 102 also have an improved and more uniform appearance. The improved appearance is not insignificant, since the non-uniform appearance could be distracting to a golfer, resulting in poor performance.

FIG. 7 shows a heavy-buffed comparison of groups I, II, III of FIGS. 5 and 6. The buff performed was a 0.004 deep inch cylindrical buff. Both groups of dimples 106, 108 of the conventional golf ball products of Groups I, II are badly distorted and far too widely spread across the equator. Dimples 102 of the present invention, in contrast, are less distorted, similar to the buffed dimples of Group I in FIG. 6.

FIG. 8 shows a comparison of an ideal golf ball product and a preferred embodiment of a golf ball product made according to the present invention. It is a cross-sectional view taken on a plane passing through the polar axis of the ball and the centers of two opposing dimples along the equator. The dimensions presented below are provided for illustrative purposes only, and a person of skill in the art could, upon reading this patent disclosure, use the teachings of the present invention to make golf ball products having differing dimensions.

View I shows an ideal golf ball product. Dimples 102 are circular and have a diameter of approximately 0.140 inch. The distance between dimples 102 across equator E is approximately 0.007 inch.

View II shows a golf ball product 100 of the present invention upon demolding. Dimples 102 have a length of approximately 0.140 inch measured at spherical surface 110. However, as described above, golf ball product 100 has a flared area 104. This area extends above surface 110 in the area around equator E. In the illustrative example of FIG. 8, area 104 extends approximately 0.002 inch above surface 110.

View III shows golf ball product 100 of View II after buffing. Area 104 has been removed, leaving a smooth surface between dimples 102 across equator E. The outer surface of golf ball product 100 is substantially spherical and conforms to spherical surface 110. Dimples 102 are substantially uniform throughout the outer surface of the golf ball product 100, including the equatorial region. The distance between dimples 102 across equator E is approximately 0.007 inch, as in the ideal case of View I. The length of dimples 102 from end to end is approximately 0.140 inch, which is also the distance of the dimples in the ideal case of View I.

FIGS. 9–11 show comparisons of a golf ball product made according to the present invention and two conventional golf ball products at various stages of post-mold processing. Each of groups I, II, II shows two rows of dimples—one above and one below the equator. These figures show similar views as FIGS. 5–7, but the rows of dimples across the equator are interdigitated rather than being aligned.

FIG. 9 shows a pre-buff comparison, FIG. 10 shows a post-buff comparison, and FIG. 11 shows a heavy-buffed comparison. In each of these figures, Group I shows the conventional situation with no compensation made for the buffing effect, Group II shows a known attempt to compensate for the buffing effect by providing enlarged and deepened dimples, and Group III shows a buffing line configuration according to the flared equator design of the present invention.

In FIG. 9, dimples 108 of Group II are enlarged to the point that they just touch equator E. Dimples 102 of Group III appear to be egg-shaped and overlap equator E.

In FIG. 10, dimple Groups I, II, and III are shown after a 0.002 inch deep cylindrical buff, as in FIG. 6. Conventional dimples 106 of Group I are noticeably altered and D-shaped, and the spacing across equator E is too great. Enlarged/shifted dimples 108 of Group II are also D-shaped, but the spacing across equator E is not as bad as in Group I. The spacing between adjacent dimples 108 parallel to the equator, however, is too small. Dimples 102 of Group III, made according to the flared equator scheme of the present invention, are almost perfectly round. The spacing between dimples 102 both across and parallel to equator E is proper.

In FIG. 11, dimple Groups I, II, and III are shown after a 0.004 inch deep cylindrical buff, as in FIG. 7. Both groups of dimples 106, 108 of the conventional golf ball products of Groups L II are badly distorted and far too widely spread across equator E. Dimples 102 of the present invention, in contrast, are only slightly distorted.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while the dimples have been described for illustrative purposes above as being circular in cross-sectional shape, the present invention is equally applicable to dimples of any shape. Thus the present invention should not be limited by the abovements, described exemplary embodiments, but should be defined only in accordance with the following claims and their equivalents.

What is claimed is:

1. A method of forming a golf ball product, comprising:
   providing mating mold parts that cooperate to form a mold by aligning parting surfaces of said mold parts, said mold having interior surfaces of a generally spherical shape with an enlarged flared area toward the parting surfaces;
   placing a primary golf ball product within said mold;
   molding a layer on said primary golf ball product to form a golf ball product, said golf ball product having a generally spherical shape with a flared volume along a parting line of said golf ball product;
   removing said golf ball product from said mold; and
   substantially removing said flared volume from said golf ball product.

2. The method of claim 1, wherein said layer is a cover layer.

3. The method of claim 2, wherein:
   said providing includes providing a mold with a mold surface having dimple-forming protrusions thereon; and
   said molding includes forming dimples in said cover, said dimples in said flared volume being relatively deeper than said dimples outside said flared volume.

4. The method of claim 3, wherein said molding includes forming dimples of varying relative depths within said flared area.

\* \* \* \* \*